(12) United States Patent
Lim et al.

(10) Patent No.: US 9,012,056 B2
(45) Date of Patent: Apr. 21, 2015

(54) HIGH VOLTAGE BATTERY PACK APPARATUS FOR VEHICLE

(75) Inventors: Hae Kyu Lim, Seoul (KR); Yoon Cheol Jeon, Gyeonggi-do (KR); Yong Jin Lee, Gyeonggi-do (KR); Jun Ho Bang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 677 days.

(21) Appl. No.: 13/323,483

(22) Filed: Dec. 12, 2011

(65) Prior Publication Data

US 2013/0078496 A1    Mar. 28, 2013

(30) Foreign Application Priority Data

Sep. 26, 2011  (KR) .......................... 10-2011-0096710

(51) Int. Cl.
| | |
|---|---|
| *H01M 10/617* | (2014.01) |
| *B60K 1/04* | (2006.01) |
| *H01M 2/10* | (2006.01) |
| *H01M 10/613* | (2014.01) |
| *H01M 10/625* | (2014.01) |
| *H01M 10/6563* | (2014.01) |
| *B60K 1/00* | (2006.01) |

(52) U.S. Cl.
CPC .............. *B60K 1/04* (2013.01); *B60K 2001/005* (2013.01); *B60K 2001/0427* (2013.01); *H01M 2/1077* (2013.01); *H01M 10/5004* (2013.01); *H01M 10/5008* (2013.01); *H01M 10/5016* (2013.01); *H01M 10/5067* (2013.01); *H01M 2220/20* (2013.01)

(58) Field of Classification Search
USPC ............ 429/120; 180/65.1, 65.21, 68.1, 68.2, 180/68.5
See application file for complete search history.

(56) References Cited

U.S. PATENT DOCUMENTS

| | | | |
|---|---|---|---|
| 2008/0047767 A1* | 2/2008 | Tsuchiya ..................... | 180/68.5 |
| 2008/0164081 A1* | 7/2008 | Watanabe et al. ........... | 180/65.2 |
| 2010/0089675 A1* | 4/2010 | Nagata et al. ................ | 180/68.5 |

FOREIGN PATENT DOCUMENTS

| | | |
|---|---|---|
| JP | 2002-313440 A | 10/2002 |
| JP | 2003-306045 A | 10/2003 |
| JP | 2008-149818 A | 7/2008 |
| JP | 2008-254607 A | 10/2008 |
| JP | 2009-004319 A | 1/2009 |
| KR | 2000-0016882 A | 3/2000 |

* cited by examiner

*Primary Examiner* — Muhammad Siddiquee
(74) *Attorney, Agent, or Firm* — Mintz Levin Cohn Ferris Glovsky and Popeo, P.C.; Peter F. Corless

(57) ABSTRACT

Disclosed is a high voltage battery pack apparatus for a vehicle which includes a cooling device having first and second battery packs which are installed in a center console of the vehicle. The first and second battery packs may be uniformly cooled through a distribution duct to improve cooling performance which minimizes the number of cooling fans that are used. Since the number of cooling fans is minimized and a discharging duct is not used, weight reduction and cost savings can be achieved.

9 Claims, 4 Drawing Sheets front ⇐    ⇒ rear

HIGH VOLTAGE BATTERY PACK APPARATUS FOR VEHICLE

CROSS-REFERENCE TO RELATED APPLICATION

This application claims under 35 U.S.C. §119(a) the benefit of Korean Patent Application No. 10-2011-0096710 filed on Sep. 26, 2011, the entire contents of which are incorporated herein by reference.

BACKGROUND (a) Technical Field

The present invention relates to a high voltage battery pack apparatus for a vehicle. More particularly, the present invention relates to a high voltage battery apparatus for a vehicle in which a battery pack is installed in a center console.

(b) Background Art

In general, hybrid electric vehicles, fuel cell vehicles, and electric vehicles are driven by using, at some point, an electric motor and a high voltage battery pack providing driving power to the electric motor which is mounted in each vehicle. Conventionally, high voltage battery pack apparati primarily have a structure in which a battery pack 1 is installed in a designated space in a trunk compartment 2 of the vehicle. Thus, as a result the usable space in the trunk compartment of these vehicles is greatly reduced due to the size of the structure which houses the battery pack, thereby affecting the vehicles marketability and consumer rating.

Alternatively, this structure may also be fixed to a vehicle body member of an underbody panel on the outside of the vehicle, however, in this embodiment, water-proofing treatments should be additionally performed in order to insure safety. In particular, an additional safety device which can be resistant to external impact should also be provided. As a result, when the battery pack is mounted on the outside of the vehicle, the manufacturing costs are significantly increased.

Embodiments described as the background art are described as possible solutions to the problem described, but it should not be understood that the embodiments correspond to the related art which has been already known to those skilled in the art.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to provide a high voltage battery pack apparatus for a vehicle in which a trunk room of the vehicle can be more efficiently used by installing a high voltage battery pack in a center console positioned inside of the vehicle to improve merchantability and in particular, a cooling device of the battery pack is configured compactly to largely contribute to weight reduction and cost savings. The first and second battery packs may be stacked vertically and fixed to the battery case, accordingly.

In one aspect, a high voltage battery pack apparatus for a vehicle includes: a first battery pack and a secondary battery pack that are installed in a center console so as to be separated from each other. A battery case is fixed to a floor panel and is configured to cover the first and second battery packs. Additionally, a cooling device is installed in the center console to have a cooling air flow route which is configured to discharge cooled air to a rear side of the center console after cooling the first and second battery packs by using cooled air drawn in at a front side of the center console.

Preferably, the high voltage battery pack apparatus for a vehicle may further include an upper pad connecting an upper surface of the center console with a top surface of the battery case to prevent cooled air discharged to the rear side of the first and second battery packs from moving toward the front side in the center console after cooling the first and second battery packs, and a lower pad connecting the floor panel with a bottom surface of the battery case.

Additionally, the high voltage battery pack apparatus for a vehicle may further include a diaphragm member installed between a bottom surface of the center console and rear surfaces of the first and second battery packs to divide an internal space of the center console into a first chamber in which the first and second battery packs are installed and a second chamber for discharging cooled air, and an upper grill and a lower grill connecting the first and second chambers may be formed on upper and lower ends of the diaphragm member, respectively.

In some embodiments, an upper passage and a lower passage that guide the flow of cooled air may be provided in a space between a top surface of the first battery pack and a top surface of the center console and a space between a bottom surface of the second battery pack and the floor panel, respectively, so that cooled air for cooling the first and second battery packs smoothly moves towards the rear side of the center console.

Furthermore, a cooled air discharging aperture may be provided between the bottom of the rear surface of the center console and the floor panel so as to discharge the cooled air for cooling the first and second battery packs to a lower side of the rear surface of the center console.

The cooling device may include: a cooling fan housing fixed to be positioned in front of the first and second battery. The cooling fan housing may include a cooling fan rotatably provided therein. A suction duct may be connected to the front side of the cooling fan housing to draw in cool air from the outside. Furthermore, a distribution duct may be configured to connect and control the flow of air from the cooling fan housing to the first and second battery packs. In particular, one end of the distribution duct is connected to the cooling fan housing and the other end is installed to be disposed in a space between the first and second battery packs to distribute and supply cool air to the first and second battery packs.

The suction duct described above, may include: a front duct which is configured to connect and control the flow of cool air between the front side of the cooling fan housing to the front side of the center console. That is, one end is connected to the front side of the cooling fan housing and the other end is installed to be disposed in the front side of the center console. Additionally, a pair of side ducts may be configured to connect and control the flow of cool air between the front duct and both side portions of the center console. In particular, ends of the pair of side ducts are connected to the front duct and the other ends are installed to penetrate both side portions of the center console, respectively, to draw in cool air from inside of the vehicle.

In some embodiments, a plurality of distribution apertures for distributing and supplying cooled air to the first and second battery packs may be provided in the distribution duct to be opened vertically. An interval between the distribution apertures may be preferably formed to maintain the same interval from a battery cell constituting the first and second battery packs. Further, the front duct may be installed to be connected with a duct which is connected to an air-conditioning apparatus in the vehicle. Even further,

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
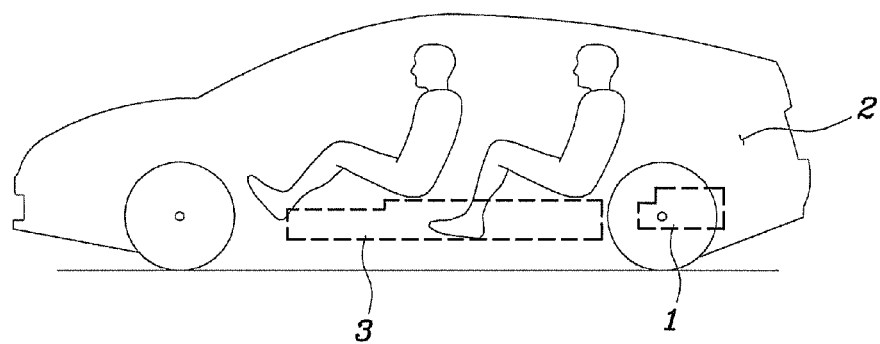
FIG. 1 is a diagram showing an installation state of a high voltage battery pack apparatus for a vehicle according to a structure in conventional art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a high voltage battery pack apparatus according to an exemplary embodiment of the present invention will be described with reference to the accompanying drawings. The high voltage battery pack apparatus according to the exemplary embodiment of the present invention is a structure installed in a center console provided inside of the vehicle.

Figure 2:
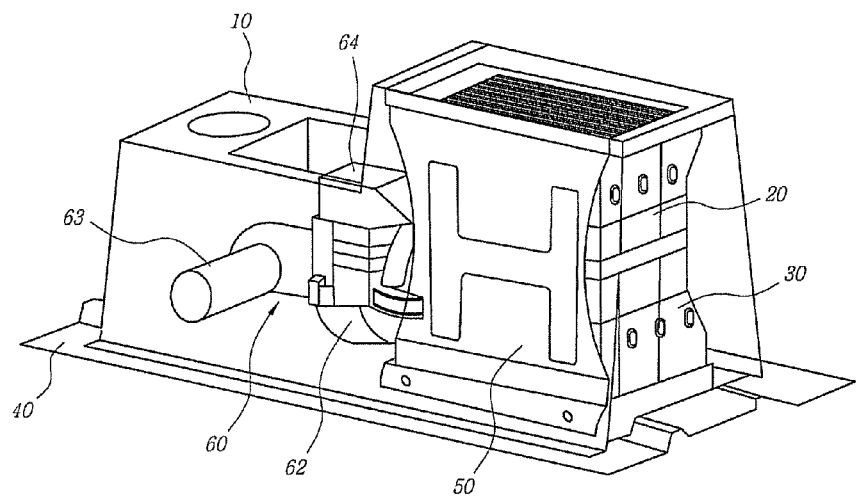
FIGS. 2 to 4 are a perspective view, a side view, and a plan view of a high voltage battery pack apparatus for a vehicle according to an exemplary embodiment of the present invention.
Figure 3:
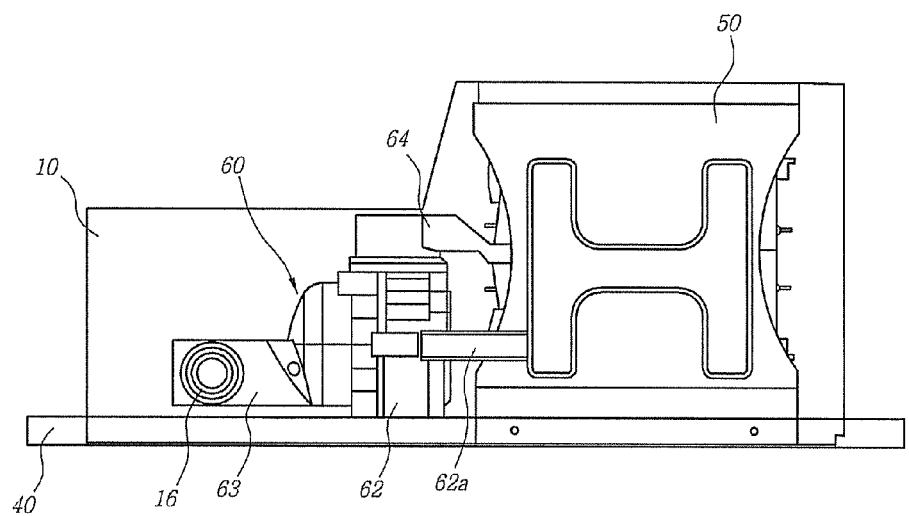
Figure 4:
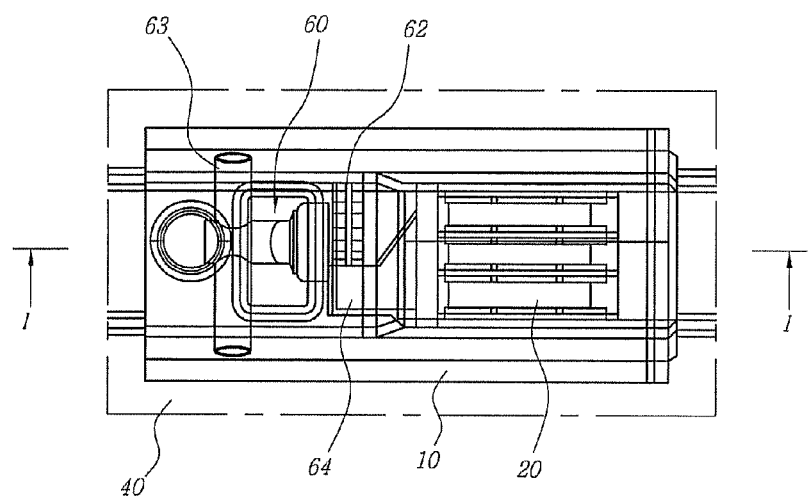
Figure 5:
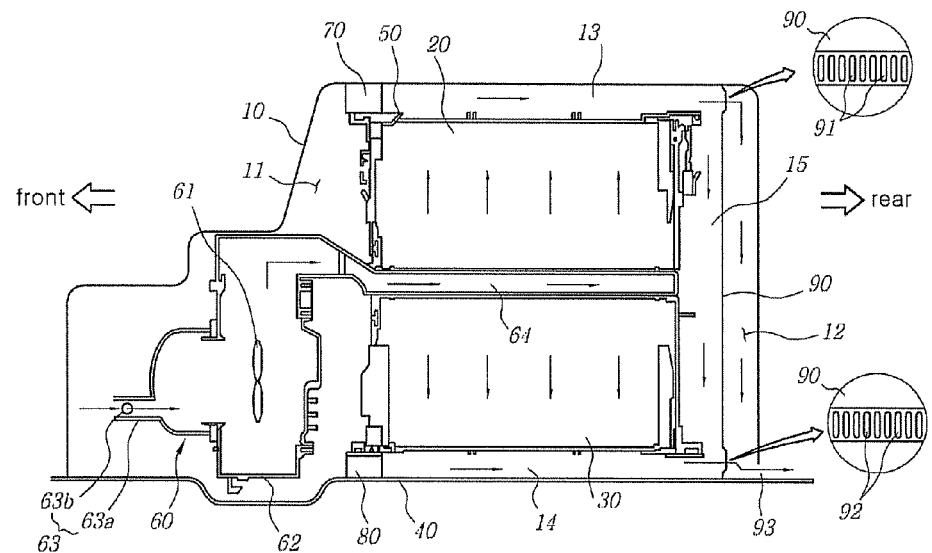
FIG. 5 is a cross-sectional view taken along line I-I of FIG. 4.
Figure 6:
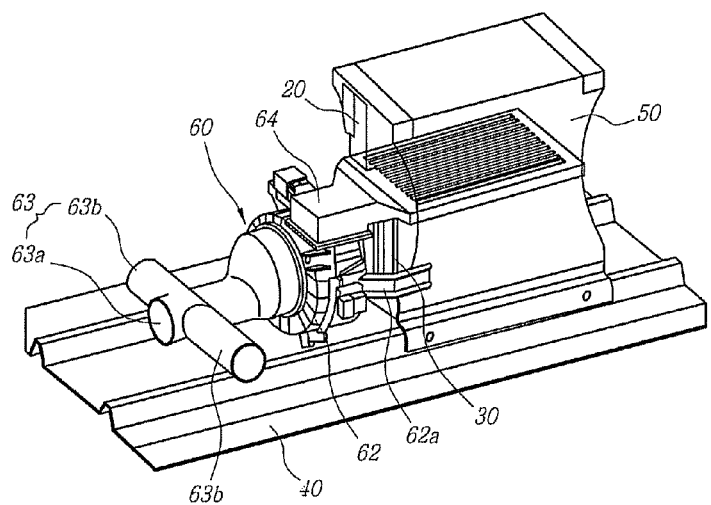
FIG. 6 is a diagram showing a state in which a center console is removed from FIG. 2.
Figure 7:
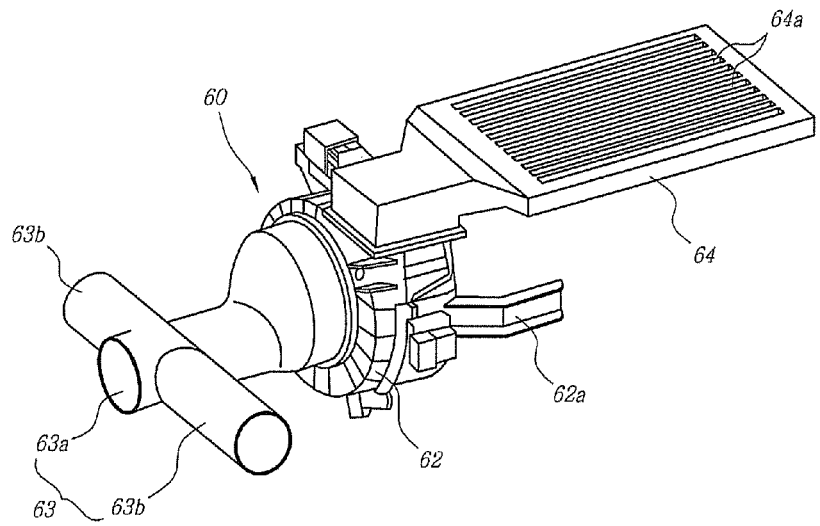
FIG. 7 is a perspective view of a cooling device in a high voltage battery pack apparatus for a vehicle according to an exemplary embodiment of the present invention.
Figure 8:
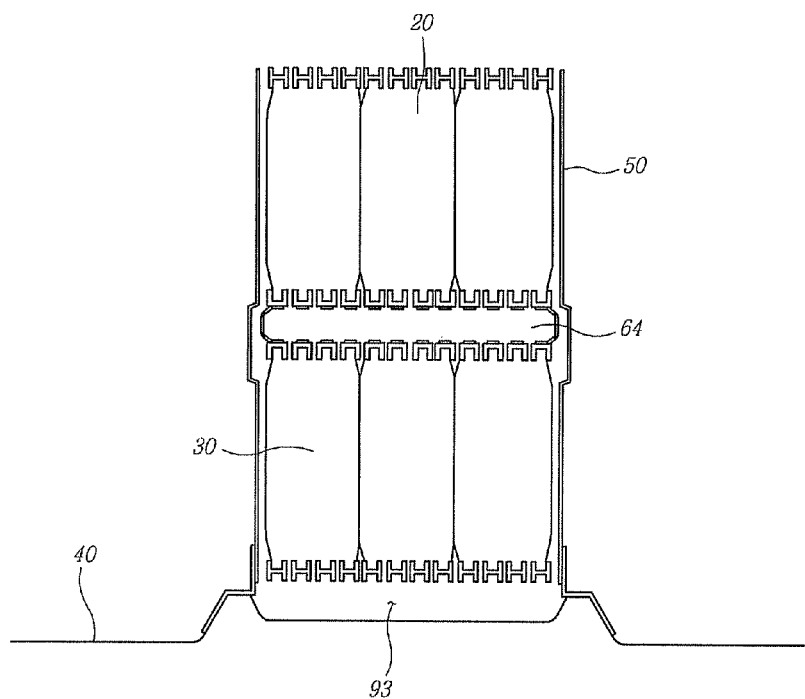
FIG. 8 is a bottom view for showing a cooling air discharging aperture in a high voltage battery pack apparatus for a vehicle according to an exemplary embodiment of the present invention.

That is, as shown in FIGS. 2 to 8, the high voltage battery pack apparatus 200 includes a first battery pack 20 and a secondary battery pack 30 that are installed in a center console 10 and disposed to be separated from each other specified distance (thereby providing a space therebetween). A battery case 50 is fixed to a floor panel 40 and is configured to cover the first and second battery packs 20 and 30. A cooling device 60 installed in the center console 10 to have a cooling air flow route that is configured to discharge cool air toward a rear side 21 of the center console 10 after cooling the first and second battery packs 20 and 30 by using cooled air drawn in at a front side of the center console 10.

Additionally, the apparatus also includes an upper pad 70 which connects an upper surface 17 of the center console 10 with a top surface 18 of the battery case 50 to prevent cool air discharged to a rear side 23 of the first and second battery packs 20 and 30 from moving toward a front side 24 of the center console 10 after cooling the first and second battery packs 20 and 30. A lower pad 80 connects the floor panel 40 with a bottom surface 19 of the battery case 50, and a diaphragm member 90 is installed between a rear surface 25 of the center console 10 and rear surfaces of the first and second battery packs 26 to divide an internal space of the center console 10 into a first chamber 11 in which the first and second battery packs 20 and 30 are installed and a second chamber 12 for discharging cool air. An upper grill 91 and a lower grill 92 connecting the first and second chambers 11 and 12 are formed on upper and lower ends of the diaphragm member 90, respectively.

An upper passage 13 and a lower passage 14 that control/direct the flow of cool air are provided in a space between a top surface 27 of the first battery pack 20 and a top surface 28 of the center console 10 and a space between a bottom surface 29 of the second battery pack 30 and the floor panel 40, respectively, so that cool air for cooling the first and second battery packs 20 and 30 smoothly moves to the rear side 24 of the center console 10.

That is, the upper pad 70 is installed in the upper passage 13 and the lower pad 80 is installed in the lower passage 14. A cooled air discharging aperture 93 is provided between a rear portion of a bottom surface 31 of the center console 10 and the floor panel 40 to discharge the cooled air for cooling the first and second battery packs 20 and 30 to a lower side of the rear surface of the center console 10.

Therefore, in the apparatus according to the exemplary embodiment of the present invention, the first and second battery packs 20 and 30 are cooled while the cool air drawn in through the cooling device 60 is distributed to the first and second battery packs 20 and 30, and air passing through the first and second battery packs 20 and 30 moves toward the rear side 21 of the center console 10 and thereafter, moves through the rear passage 15 provided between the first and second battery packs 20 and 30 and the diaphragm member 90 and the second chamber 12 provided between the rear surface 25 of the center console 10 and the diaphragm member 90, and finally, is discharged to the rear side 21 through the cooled air discharging aperture 93 provided between the rear portion of the bottom surface 31 of the console 10 and the floor panel 40.

Herein, the upper grill 91 formed in the diaphragm member 90 connects the upper passage 13 and the second chamber 12 and the lower grill 92 formed in the diaphragm member 90 connects the lower passage 14 and the second chamber 12. Additionally, the first and second battery packs 20 and 30 are stacked vertically and fixed to the battery case 50.

In addition, the cooling device 60 includes a cooling fan housing 62 fixed to be positioned in front of the first and second battery packs 20 and 30. The cooling fan housing includes a cooling fan 61 rotatably provided therein, a suction duct 63 connected to the front side of the cooling fan housing 62 to draw in cooled air in from the outside, and a distribution duct 64 which is configured to connect and control the direction of cool air between the surface of the cooling fan housing and the space between the first and second battery packs 20 and 30. That is, one end of the distribution duct 64 is connected to the cooling fan housing 62 and the other end is installed to be disposed in a space between the first and second battery packs 20 and 30 to distribute and supply cool air to the first and second battery packs 20 and 30. As can be seen by the illustrative example, the cooling fan housing 62 is fixed to be connected with the battery case 50 via a housing bracket 62a.

The suction duct 63 includes a front duct 63a which is configured to connect and direct the flow of cool air from inside of the vehicle to the front side of the fan housing. That is, one end is connected to the front side of the cooling fan housing 62 and the other end is installed to be disposed in the front side of the center console 10. The suction duct 63 also includes a pair of side ducts 63b which are configured to connect and direct the flow of cool air pulled in from the side of the console 10 to the front of the fan housing. That is, one end intersects with to the front duct 63a and the other ends are installed to penetrate both side portions, respectively, to draw in internal air of the vehicle from sides of the console 10.

A duct grill 16 is integrally provided at each of both side portions of the center console 10. Therefore, each end of the side duct 63b is installed to be connected with the duct grill 16 and impurities are prevented from passing into the side duct 63b by the duct grill 16. The front duct 63a is preferably installed to be connected with an auxiliary duct of an air-conditioning apparatus of the vehicle. That is, cool air inside of the vehicle is drawn in through the side ducts 63b. However, this cool air may not be sufficient to cool the first and second battery packs 20 and 30 depending on an indoor environment. Accordingly, cool air discharged from the air-conditioning apparatus of the vehicle is drawn in through the front duct 63a as necessary to cool the first and second battery packs 20 and 30 more efficiently.

In addition, a plurality of distribution apertures 64a for distributing and supplying cooled air to the first and second battery packs 20 and 30 are provided in the distribution duct 64 to be opened vertically. Each of the distribution apertures 64a is opened toward the first and second battery packs 20 and 30, and an interval between the distribution apertures 64a is preferably formed to maintain the same interval from a battery cell constituting the first and second battery packs 20 and 30.

That is, each of the battery packs 20 and 30 is configured by combining a plurality of battery cells in a predetermined pattern. Therefore, when the interval between the distribution apertures 64a is the same as the interval between the battery cells, a distribution aperture 64a faces each of the battery cells constituting the first and second battery packs 20 and 30. Accordingly, the cool air discharged through the distribution aperture 64a can directly cool each of the battery cells constituting the first and second battery packs 20 and 30 to cool the first and second battery packs 20 and 30 more efficiently, thereby improving the cooling performance.

When the cooling device 60 starts to operate, the cooled air is drawn into the suction duct 63 by suctional force created by rotation the cooling fan 61. The cool air drawn in by the fan 61 passes through the cooling fan housing 62 and thereafter, flows toward the distribution duct 64. The cooled air that moves through the distribution duct 64 is discharged over the first and second battery packs 20 and 30 through the distribution aperture 64. At this time, the cooled air discharged through the distribution aperture 64 cools the first and second battery packs 20 and 30 while directly passing through the battery cells constituting the first and second battery packs 20 and 30.

In addition, the cooled air passing through the first and second battery packs 20 and 30 moves to the rear side 21 of the center console 10 through the upper and lower passages 13 and 14 and thereafter, since a discharging process of the cooled air is the same as the above mentioned process, a description thereof will be omitted.

As described above, the high voltage battery pack apparatus for the vehicle according to the exemplary embodiment of the present invention, which has the structure in which the cooling device 60 including the first and second battery packs 20 and 30 is installed in the center consoles 10 instead of in the trunk room of the vehicle or on an underbelly panel outside the vehicle, and as a result, the trunk space of the vehicle can be used more efficiently and further, an additional waterproof treatment and a device for protection from impact may be omitted, thereby achieving weight reduction and cost saving.

Further, since the cooling device 60 is installed in the center console, the high voltage battery pack apparatus can be configured compactly. As the first and second battery packs 20 and 30 can be uniformly cooled through the distribution duct 64, more efficient cooling can be achieved and furthermore, the cooling performance can be significantly improved.

In addition, the number of the cooling fans 61 can be minimized by the configuration in which the first and second battery packs 20 and 30 can be cooled simultaneously by using one cooling fan 61 and in particular, since a discharging duct for discharging cooled air is not required, weight reduction and cost saving can be achieved.

In a high voltage battery pack apparatus according to an exemplary embodiment of the present invention, a trunk room of a vehicle can be more efficiently used by installing a cooling device including first and second battery packs in a center console, more efficient cooling can be achieved and cooling performance can be improved by uniformly cooling the first and second battery packs through a distribution duct, and in particular, the number of cooling fans can be minimized by a configuration capable of cooling the first and second battery packs simultaneously with one cooling fan, and furthermore, weight reduction and power saving can be achieved by a configuration without a discharge duct for discharging cooling air.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A high voltage battery pack apparatus for a vehicle, comprising:
   a first battery pack and a secondary battery pack installed in a center console and disposed to be separated from each other;

a battery case fixed to a floor panel and configured to cover the first and second battery packs;

a cooling device installed in the center console to have a cooling air flow route configured to discharge cool air to a rear side of the center console after cooling the first and second battery packs by using cooled air drawn in at a front side of the center console;

an upper pad connecting an upper surface of the center console with a top surface of the battery case to prevent cooled air discharged to the rear side of the first and second battery packs from moving toward the front side in the center console after cooling the first and second battery packs, and a lower pad connecting the floor panel with a bottom surface of the battery case; and a diaphragm member installed between a bottom surface of the center console and rear surfaces of the first and second battery packs to divide an internal space of the center console into a first chamber in which the first and second battery packs are installed and a second chamber for discharging cooled air, wherein an upper grill and a lower grill connecting the first and second chambers are formed on upper and lower ends of the diaphragm member, respectively.

2. The high voltage battery pack apparatus for a vehicle of claim 1, wherein an upper passage and a lower passage that guide the flow of cooled air are provided in a space between a top surface of the first battery pack and a top surface of the center console and a space between a bottom surface of the second battery pack and the floor panel, respectively, wherein the cool air smoothly moves toward the rear side of the center console.

3. The high voltage battery pack apparatus for a vehicle of claim 1, wherein a cooled air discharging aperture is provided between a rear portion of a bottom surface of the center console and the floor panel to discharge cooling air to a lower side of the rear surface of the center console.

4. The high voltage battery pack apparatus for a vehicle of claim 1, wherein the first and second battery packs are stacked vertically and fixed to the battery case.

5. The high voltage battery pack apparatus for a vehicle of claim 1, wherein the cooling device includes:

a cooling fan housing fixed to be positioned in front of the first and second battery packs and including a cooling fan rotatably provided therein;

a suction duct connected to the front side of the cooling fan housing to draw in cooled air from the outside, and a distribution duct configured to connect and direct the flow of air from the cooling fan housing to a space between the first and second battery packs wherein one end is connected to the cooling fan housing and the other end is installed to be disposed in the space between the first and second battery packs to distribute and supply cool air to the first and second battery packs.

6. The high voltage battery pack apparatus for a vehicle of claim 5, wherein the suction duct includes:

a front duct configured to connect and direct cool air from the front side of the center console to the front side of the fan, wherein one end is connected to the front side of the cooling fan housing and the other end is installed to be disposed in the front side of the center console; and a pair of side ducts configured to connect and direct the cool air from the sides of the console to an intersection in the front duct, wherein one end of the pair of side ducts intersect with the front duct and the other ends are installed to penetrate both side portions, respectively, to draw in cool air from inside of the vehicle.

7. The high voltage battery pack apparatus for a vehicle of claim 5, wherein a plurality of distribution apertures configured to distribute and supply cool air to the first and second battery packs are provided in the distribution duct to be opened vertically.

8. The high voltage battery pack apparatus for a vehicle of claim 7, wherein the front duct is connected with an auxiliary duct of an air-conditioning apparatus installed in the vehicle.

9. The high voltage battery pack apparatus for a vehicle of claim 7, wherein an interval between the distribution apertures is formed to maintain the same interval from a battery cell constituting the first and second battery packs.

* * * * *